UNITED STATES PATENT OFFICE

WALTER MIEG, OF OPLADEN, AND RUDOLF MARIA HEIDENREICH, OF LEVERKUSEN-ON-THE-RHINE, GERMANY, ASSIGNORS TO GENERAL ANILINE WORKS, INC., OF NEW YORK, N. Y., A CORPORATION OF DELAWARE

PROCESS FOR DYEING AND PRINTING TEXTILE FIBERS

No Drawing. Application filed June 18, 1930, Serial No. 462,139, and in Germany June 19, 1929.

The present invention relates to a process for dyeing and printing textile fibers by impregnating (that is dyeing or printing) the fibers with an ester of a leuco compound of a vat dyestuff of the anthraquinone series, saponifying this ester on the fiber by means of an alkaline agent and oxidizing the leuco compound to the vat dyestuff, from which the leuco ester is derived.

In accordance with the present invention textile fibers are impregnated in the known manner with an ester of a leuco compound of a vat dyestuff of the anthraquinone series having in its free form the probable formula:

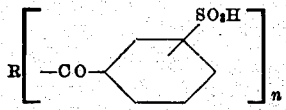

wherein R stands for the radical of a leuco derivative of a vat dyestuff of the anthraquinone series, the CO-group being attached to an oxygen atom, which on its part is linked to a carbon atom standing in meso-position of an anthraquinone nucleus, and wherein $n$ stands for one of the numbers 1 or 2.

These substances are applied in a simple manner for dyeing and printing cotton, wool and the like, by bringing the ester on to the fibre in a suitable manner, for example, on cotton by slop-padding or printing and on wool by acid dyeing and then decomposing the ester on the fibre by means of an alkali.

When using for the printing of cotton the leuco esters of anthraquinone vat dyestuffs, obtainable by reacting upon a leuco derivative of an anthraquinoid vat dyestuff with a benzoic acid sulfo halide in the presence of a tertiary heterocyclic base as described in U. S. Patent No. 1,878,964, issued on September 20, 1932, it is possible to add a little alkali to the thickening required for the printing process, in which case the decomposition and oxidation to the dyestuff is already partially accomplished by moist steaming. The developing of the dyestuff is completed by passing the dyeings through a dilute alkali for a short time and oxidation is effected by exposing the printing to the action of an oxidizing agent as, for instance, air.

The invention is illustrated by the following example without being restricted thereto:

*Example.*—Cotton is printed with a dyestuff paste consisting of:
5 parts by weight of the leuco-N-dihydro-1.2-2'.1'-anthraquinone-azine ester, obtainable by reacting upon leuco-N-dihydro-1.2-2'.1'-anthraquinone azine with a mixture of benzoic-acid-meta-sulfochloride and pyridine at a temperature of about 70–80° C. (see U. S. Patent No. 1,878,964 of September 20, 1932).

5 parts by weight of thiodiglycol
20 parts by weight of gum
70 parts by weight of a thickening
---
100

The thickening is prepared according to the following directions:—
100 grams of potassium sulfite solution (45° Bé.) are mixed with
400 grams of caustic soda solution 36° Bé. and
500 grams of commercial gum 1:1
---
1000

The printing is steamed while damp (¼ hour), whereby the decomposition and oxidation to the dyestuff already takes place to a far reaching extent. The developing is completed by a short immersion of the printing into dilute alkali. A clear blue printing of N-dihydro-1.2-2'.1 anthraquinone- azine is thus obtained.

We claim:—

1. Process which comprises impregnating textile fibers with a compound having in its free form the probable formula:

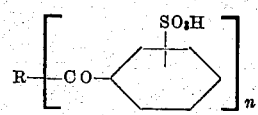

wherein R represents the radical of a leuco derivative of an anthraquinoid vat dyestuff, the CO-group being attached to an oxygen atom, which on its part is linked to a carbon atom standing in meso-position of an anthraquinone nucleus, $n$ stands for one of the numbers 1 or 2, and developing the dyestuff on the fibre by treating the latter with an alkali and an oxidizing agent.

2. Process which comprises impregnating textile fibres with a compound having in its free form the probable formula:—

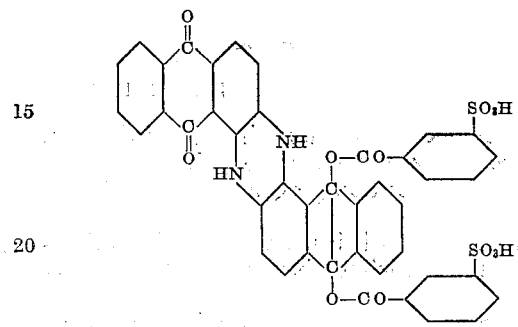

and developing the dyestuff on the fibre by treating the latter with an alkali and an oxidizing agent.

In testimony whereof, we affix our signatures.

WALTER MIEG.
RUDOLF MARIA HEIDENREICH.